(12) United States Patent
Karklinsky et al.

(10) Patent No.: US 12,547,801 B1
(45) Date of Patent: Feb. 10, 2026

(54) OPTIMAL PLAY ROUTE PREDICTION DURING SPORTS BROADCASTS

(71) Applicant: Amazon Technologies, Inc., Seattle, WA (US)

(72) Inventors: Matan Karklinsky, Zur Hadassa (IL); Gabriel Pragier, Herzliya (IL); Bar Segev, Petah Tikva (IL); Sam Schwartzstein, Palo Alto, CA (US); Dan Pawlowski, Vineyard, UT (US); Michael Rotman, Petah Tikva (IL); Avi Avraham Ben-Cohen, Holon (IL); Ianir Ideses, Raanana (IL); Yochai Zvik, Modiin (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/973,924

(22) Filed: Dec. 9, 2024

(51) Int. Cl.
| | |
|---|---|
| *G06F 30/27* | (2020.01) |
| *A63B 24/00* | (2006.01) |
| *H04N 21/2187* | (2011.01) |
| *H04N 21/81* | (2011.01) |

(52) U.S. Cl.
CPC .......... *G06F 30/27* (2020.01); *A63B 24/0021* (2013.01); *H04N 21/2187* (2013.01); *H04N 21/8146* (2013.01); *A63B 2024/0056* (2013.01)

(58) Field of Classification Search
CPC ................ G06F 30/27; A63B 24/0021; A63B 2024/0056; H04N 21/2187; H04N 21/8146
See application file for complete search history.

(56) References Cited

U.S. PATENT DOCUMENTS

| | | | | |
|---|---|---|---|---|
| 4,570,232 A | * | 2/1986 | Shikano | G10L 15/12 704/241 |
| 5,598,557 A | * | 1/1997 | Doner | G06F 16/3346 707/999.005 |
| 6,085,160 A | * | 7/2000 | D'hoore | G10L 15/005 704/277 |
| 6,098,458 A | * | 8/2000 | French | A63B 24/0021 73/379.04 |
| 6,186,834 B1 | * | 2/2001 | Arnett | H01R 13/6467 439/676 |
| 6,188,987 B1 | * | 2/2001 | Fielder | H04N 21/4342 704/229 |
| 6,442,518 B1 | * | 8/2002 | Van Thong | G10L 15/26 704/235 |

(Continued)

*Primary Examiner* — Michael B. Pierorazio
(74) *Attorney, Agent, or Firm* — K&L Gates LLP

(57) ABSTRACT

Systems and techniques are described for providing optimal play route prediction during sports broadcasts. In various examples, a first frame of tracking data indicating a first respective location of each player of a first plurality of players on a field plane may be received at a first time. A first predicted direction of motion may be determined for the first frame based at least in part on a first objective. A second frame of tracking data indicating a second respective location of each player of the first plurality of players on the field plane may be received at a second time. A second predicted direction of motion for the second frame may be determined based at least in part on the first objective. A first graphical overlay may be displayed on a live video feed based on one or more of the first predicted direction and the second predicted direction.

20 Claims, 10 Drawing Sheets

(56) References Cited

U.S. PATENT DOCUMENTS

| | | | | |
|---|---|---|---|---|
| 6,473,778 B1* | 10/2002 | Gibbon | G06F 40/103 | 715/201 |
| 7,047,191 B2* | 5/2006 | Lange | G10L 15/26 | 704/235 |
| 7,065,524 B1* | 6/2006 | Lee | G16H 50/50 | 706/45 |
| 7,092,888 B1* | 8/2006 | McCarthy | G10L 15/1822 | 704/277 |
| 7,509,385 B1* | 3/2009 | Rittmeyer | G06Q 10/107 | 715/224 |
| 7,729,917 B2* | 6/2010 | Miyamoto | G10L 15/22 | 704/275 |
| 7,739,253 B1* | 6/2010 | Yanovsky | G06F 16/9535 | 707/706 |
| 7,801,910 B2* | 9/2010 | Houh | G06F 16/583 | 707/765 |
| 7,962,331 B2* | 6/2011 | Miller | G10L 15/193 | 704/235 |
| 8,121,432 B2* | 2/2012 | Dorai | G06F 16/7844 | 382/276 |
| 8,131,545 B1* | 3/2012 | Moreno | G10L 15/04 | 704/235 |
| 8,423,363 B2* | 4/2013 | Gupta | G10L 15/22 | 704/251 |
| 8,572,488 B2* | 10/2013 | Phillips | G06F 3/0482 | 715/716 |
| 11,785,278 B1* | 10/2023 | Stone | H04N 21/440236 | 348/564 |
| 2002/0055950 A1* | 5/2002 | Witteman | G06F 16/40 | 707/E17.009 |
| 2002/0093591 A1* | 7/2002 | Gong | H04N 21/2368 | 348/E7.063 |
| 2003/0025832 A1* | 2/2003 | Swart | H04N 21/4828 | 348/E7.071 |
| 2003/0061028 A1* | 3/2003 | Dey | G06F 16/40 | 704/9 |
| 2003/0169366 A1* | 9/2003 | Lenzi | H04N 7/10 | 348/461 |
| 2003/0206717 A1* | 11/2003 | Yogeshwar | G11B 27/10 | 386/328 |
| 2004/0096110 A1* | 5/2004 | Yogeshwar | G06F 16/51 | 707/E17.031 |
| 2005/0227614 A1* | 10/2005 | Hosking | H04N 7/165 | 455/3.06 |
| 2006/0015339 A1* | 1/2006 | Charlesworth | G10L 15/187 | 704/E15.02 |
| 2006/0248073 A1* | 11/2006 | Jones | G06F 16/3328 | 707/999.005 |
| 2007/0011012 A1* | 1/2007 | Yurick | G10L 15/26 | 704/277 |
| 2007/0124147 A1* | 5/2007 | Gopinath | G10L 15/19 | 704/E15.021 |
| 2007/0124756 A1* | 5/2007 | Covell | G06F 16/635 | 348/E7.071 |
| 2007/0124788 A1* | 5/2007 | Wittkoter | H04N 7/165 | 348/E7.071 |
| 2007/0214164 A1* | 9/2007 | MacLennan | G06F 16/90 | |
| 2008/0066138 A1* | 3/2008 | Bishop | G06F 40/58 | 725/137 |
| 2008/0166106 A1* | 7/2008 | Ozawa | H04N 21/8113 | 386/245 |
| 2008/0255844 A1* | 10/2008 | Wu | G10L 15/193 | 704/E15.022 |
| 2008/0266449 A1* | 10/2008 | Rathod | H04N 21/8133 | 348/E7.001 |
| 2008/0270134 A1* | 10/2008 | Miyamoto | H04N 7/0885 | 348/E7.001 |
| 2009/0171662 A1* | 7/2009 | Huang | G10L 15/1822 | 704/E15.041 |
| 2010/0091187 A1* | 4/2010 | Topiwalla | H04N 21/4355 | 348/E7.003 |
| 2011/0022386 A1* | 1/2011 | Gatzke | G10L 15/26 | 704/235 |
| 2011/0040559 A1* | 2/2011 | Kim | G10L 21/055 | 704/271 |
| 2011/0273562 A1* | 11/2011 | Dawe | A63B 69/3658 | 348/139 |
| 2012/0101817 A1* | 4/2012 | Mocenigo | G10L 15/063 | 704/E15.001 |
| 2012/0253799 A1* | 10/2012 | Bangalore | G10L 15/183 | 704/E15.001 |
| 2012/0277890 A1* | 11/2012 | Han | A63B 24/0006 | 700/91 |
| 2016/0007054 A1* | 1/2016 | Polumbus | G11B 27/10 | 725/116 |
| 2020/0114243 A1* | 4/2020 | Janssen | G09B 19/0038 | |
| 2023/0359789 A1* | 11/2023 | Andre | G06F 30/27 | |
| 2024/0169579 A1* | 5/2024 | Luengo Muntion | G16H 20/40 | |
| 2024/0176933 A1* | 5/2024 | Xiao | G06T 17/00 | |

* cited by examiner

OPTIMAL PLAY ROUTE PREDICTION DURING SPORTS BROADCASTS

BACKGROUND

Video streaming refers to technology that allows users to watch video content over the internet in real-time without first downloading the entire media file. Streamed video is often buffered, meaning that some of the video is stored temporarily on the user's device to ensure smooth playback despite possible network slowdowns. Video streaming can be either on-demand or live. On-demand streaming refers to situations in which pre-recorded video is stored on a server and can be watched at any time. Live streaming, on the other hand, refers to situations in which the content is broadcast in real-time (or near real time) over the internet, such as a live video feed from a news channel. In the context of live sporting events, video streaming allows fans to watch games and matches in real-time through the internet. Live streams and/or live broadcasts of sporting events often are accompanied by live commentary and may include additional features such as instant replays, statistics overlays, and different camera angles from which the event may be shown.

DETAILED DESCRIPTION

Figure 1:
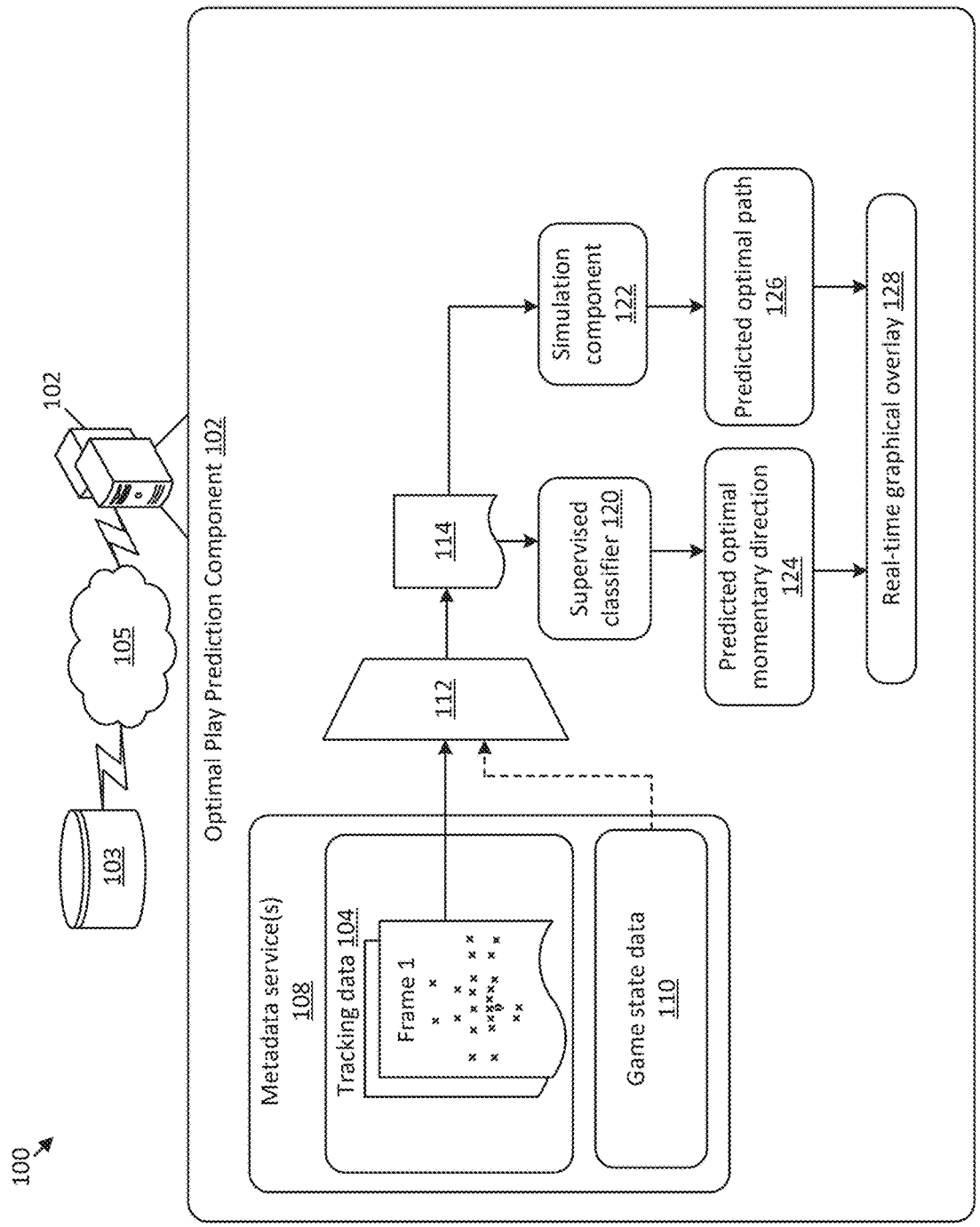
FIG. 1 is a diagram illustrating a system including an optimal play prediction component, in accordance with various aspects of the present disclosure.

In the following description, reference is made to the accompanying drawings which illustrate several embodiments of the present invention. It is understood that other embodiments may be utilized, and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

Graphical overlays are often used to enhance the viewing experience during live video feeds of sporting events (e.g., video streamed over the internet and/or broadcasted using wireless transmissions), ideally without interrupting the viewing of the live event. For example, in American football, virtual first down lines are rendered on the video feed in such a way that the virtual first down lines appear to be on the physical field so that players appear to run over them in the video feed, even though the line is not present in the physical environment. This typically involves superimposing the graphical overlay of the virtual first down line on the field at a depth of field such that players appear to run over the line creating the illusion that the line is actually present on the ground.

During a live video feed of a sporting event, it may be desirable to illustrate to viewers an optimal path for a given player and/or an optimal momentary direction of motion, where optimality is determined according to a predefined sport-specific objective. For example, a graphical overlay indicating an optimal path may help to illustrate (to viewers) the optimal path of a running back carrying the ball in American football based on the current offensive and/or defensive formations and movements. Such graphical overlays may enhance the viewing experience by illustrating the player paths and/or momentary motions that are predicted to lead to the best result. In addition, when graphical overlays indicating such optimal paths/motions are rendered, viewers can detect when players diverge from such paths (potentially resulting in non-optimal results). Currently, there are no techniques that can predict optimal paths and/or motions of players in live sports feeds, in real time, and display the predicted motions and/or paths to a viewer of a video feed as the play is occurring. In addition to providing enhanced experiences for viewers of a live sports feed, the various systems and techniques described herein may be used to provide heretofore non-existent coaching tools for players of the sport. The players can review video of a play to see the path actually taken and may compare this path to an optimal path. Optimality may be concretely defined for the given sport using various sport-specific metrics. Taking the example of American football, an example metric may be the number of yards gained during a play. A predicted optimal motion/path may be the motion/path that is predicted to result in the highest number of yards gained, based on the current player formations and/or movements. The current player formations and/or movements may be sampled in real-time so that the predicted optimal motion/path may be continually updated, in real time, as the play is unfolding. A predicted optimal motion/path may be sport-specific. For example, an optimal path or movement in basketball may be very different from an optimal movement in soccer. Similarly, the optimal path for a thrown disc in an Ultimate match may be very different from the optimal path of a golf ball driven off the tee. Accordingly, the various predictive models and/or techniques may use sport-specific training data, objectives, and/or constraints in order to predict optimal movements, plays, and/or paths relevant to the particular sport. Accordingly, the various predictive techniques described herein may be applied in any desired sport (as well as to other situations where a predicted optimal path is to be determined), without limitation.

Various examples described herein may use a supervised machine learning classifier, regression model, and/or a physics-based simulator to predict a direction of motion of a player (e.g., a ball carrier) given the current player formations and movements. The current player formations and movements may be determined using tracking data which may be generated using sensors worn by the players and/or embedded in various equipment (e.g., a ball or other equipment used to play the sport, goalposts of a goal, sidelines, etc.). The supervised machine learning classifier may divide angular space (e.g., 360 degrees in a top-down field plane representing an overhead view of a sport) into a set number of angular slices (e.g., 30° slices, 45° slices, etc.) centered around a point (e.g., a coordinate of the ball carrier in the field plane). The supervised machine learning classifier may predict the slice, which may represent a direction of motion, that is determined to be optimal for the current state of the game. The supervised machine learning classifier may determine the prediction based on training data which includes embeddings of player formations/movements labeled with a number of yards gained (or other sports-specific metric label) for a given direction taken by a player. During inference, an encoder may encode the current player formations/movements from the tracking data and may determine, based on a similarity to historical player formations/movements seen in the training data, a momentary direction of motion that is predicted to result in the best outcome (e.g., in American football—the highest number of yards gained) based on the various historical outcomes for the similar historical plays. This predicted momentary direction of motion may be updated, in real-time, as additional tracking data representing changing player formations/movements are received. The predicted momentary directions of motion may be transformed from the field plane into the video plane using homography and may be rendered as graphical overlays on the video feed to illustrate the optimal momentary direction of movement to viewers.

In various other examples, a simulation component may use sampled tracking data for the current state of the game to initiate a simulation of the current play. The simulation may be a physics-based simulation that attempts to generate an optimal path for a player (e.g., a ball carrier in American football) and/or a ball (e.g., a thrown pass in American football) according to one or more objectives (e.g., gaining a maximum number of yards in American football) and subject to one or more sport-specific constraints (e.g., avoiding defensive players (for a ball carrier), attempting to intersect with the ball carrier (for defensive players), attempting to intersect with defensive players (for non-ball carriers on the offensive team), attempting to avoid non-ball carriers (for defensive players)). The simulation result may be used to generate a path in the field plane (e.g., of the ball carrier), which may be rendered as a graphical overlay on the live video feed. For example, the graphical overlay may show a predicted optimal path that the ball carrier may take to pass the line of scrimmage. In a different example, the graphical overlay may show a predicted flight of a thrown pass and/or a predicted reception point on the field (e.g., where a receiver may catch the ball). In addition, the simulation may be executed for each sampled frame of tracking data during the play. As such, the resulting paths (from each simulation) may be used to update the predicted optimal path based on the changing game conditions (e.g., player locations, formations, movements, headings, speed, etc.).

As described above, the various systems and techniques described herein offer technological improvements to live video, enabling a variety of graphical enhancements to be made in real-time, during the live gameplay and reacting to changing conditions in the gameplay. Previous approaches could only show replays using graphical illustrations of the actual route taken by players.

In various examples, players may wear sensors (e.g., chips embedded in their jerseys/helmets, etc.) that provide tracking data providing various information about the player (e.g., velocity, direction, player name, player number, in-game statistics, etc.) in the planar coordinate system of the field plane (e.g., a surface on which the sport of interest is played (e.g., a court (basketball), a field (soccer or football), an ice rink (hockey), etc.). The chips may include global navigation satellite system (GNSS) sensors (such as global positioning system (GPS) sensors), radio frequency identification (RFID) sensors, etc. Such tracking data may be used to render a graphical overlay over the player in the video stream to provide such information to viewers. Tracking data services provide metadata streams that provide information on the location of tracked objects over time (e.g., over a plurality of tracking frames). For example, in American football, a metadata tracking service uses one or more sensors embedded within a player's jersey, the ball, and/or other equipment to generate and send tracking data that describes the players location (among other statistics and information) on a top-down two-dimensional (e.g., x, y) coordinate plane representing the playing field. When this tracking data is synchronized with a video of the event (e.g., video of a football game), graphical overlays can be provided that enhance the experience of the viewer.

Since the tracking data can represent the location of each player in the field plane (e.g., in the top-down coordinate plane of the field), formations of players can be encoded and the encoding of the formation (referred to herein as an embedding) may be used to search for similar historical plays (which have been embedded into the same embedding space), predict optimal momentary directions, perform simulations, etc. Such embeddings may represent not only the field locations of individual players, but also information about the distance between players, the player positions, etc. In addition, the tracking data can also represent other information such as player heading, velocity, acceleration, team affiliation (defensive/offensive), etc. Additionally, in some examples, multiple frames of tracking data may be embedded (e.g., as a sequence of frames for models that take input sequences) and/or by aggregating the respective embeddings of individual frames such that player movements and shifting formations may be determined over the course of multiple frames.

Generally, machine learning may be used to form predictions, solve problems, generate high-dimensional and/or semantic representations of data, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Although in many examples described herein, player formations may be encoded to generated embeddings using the players locations in the field plane provided by the tracking data, it should be noted that player location data may instead (or also) be detected in the video data and embeddings representing player formations may be generated either directly from the video data or from player location detections detected from the video data (e.g., using computer vision-based person detection).

In either case, the generated embedding representing the player formation (e.g., the formation of offensive and/or defensive players) may be used to predict optimal momentary direction of motion and/or paths of motion for a given sampled state of the game. Decisions as to whether to embed the offensive team formation, the defensive team formation, or both, may vary according to the desired implementation and/or use case. Additionally, other metadata beyond information about the player formation may be encoded to generate semantically rich embeddings. For example, in addition to the player formations, metadata representing the positions on the field (e.g., yard line, position between the hash marks, current ball position, etc.), metadata representing the score, time remaining, yards to end zone (Y2EZ), down number, yards to first down, number of timeouts remaining, etc., may be encoded to generate semantically rich representation of not only the current player formations and/or movements, but also the game state.

Storage and/or use of data related to a particular person or device (e.g., video data, notification suppression data, etc.) may be controlled by a user using privacy controls associated with a camera device and/or a companion application associated with the camera device. Users may opt out of storage of personal, device state (e.g., a paused playback state, etc.), and/or video data and/or may select particular types of data that may be stored while preventing aggregation and storage of other types of data. Additionally, aggregation, storage, and use of personal, device state, and/or video data, as described herein, may be compliant with privacy controls, even if not legally subject to them. For example, video data and other data described herein may be treated as if it was subject to acts and regulations, such as the Health Insurance Portability and Accountability Act (HIPAA) and the General Data Protection Regulation (GDPR), even if it is not actually subject to these acts and regulations. Additionally, users may opt out of data collection, and/or may opt to delete some or all of the data used by the various techniques described herein, even where deletion or non-collection of various data may result in reduced functionality and/or performance of various aspects of the systems described herein.

FIG. 1 is a diagram illustrating a system 100 including an optimal play prediction component 102, in accordance with various aspects of the present disclosure. In the example, the optimal play prediction component 102 may be implemented using one or more computing devices. In various examples, the optimal play prediction component 102 may be configured in communication with one or more non-transitory computer-readable memories 103, in accordance with various aspects of the present disclosure. In various examples, the computing device(s) implementing optimal play prediction component 102 may be configured in communication over a network 105. Although not shown in FIG. 1, the optimal play prediction component 102 may be configured in communication with one or more cameras (e.g., video cameras) used to capture video data of the relevant event (e.g., a live sporting event). In various examples, one or more of the techniques used by the optimal play prediction component 102 may be performed using an application specific integrated circuit (ASIC) and/or using a field programmable gate array (FPGA). In some other examples, various techniques of the optimal play prediction component 102 may be instantiated in software executed by one or more processors. In yet other examples, the optimal play prediction component 102 may be instantiated using some combination of hardware and software.

Network 105 may be a communication network such as a local area network (LAN), a wide area network (such as the Internet), or some combination thereof. The one or more computing devices implementing the similar historical play retrieval component 102 may communicate with non-transitory computer-readable memory 103 (e.g., either locally or over network 105). The non-transitory computer-readable memories 103 may store instructions that may be effective to perform one or more of the various techniques described herein.

The optimal play prediction component 102 may receive tracking data 104 from metadata service(s) 108 (e.g., the Next Gen Stats metadata service (NGS), VDS, etc.). Tracking data 104 may be received from one or more sensors providing metadata. For example, chips comprising one or more sensors may be embedded in sporting equipment (e.g., balls, equipment, uniforms, etc.) and may provide various metadata such as player names, numbers, positions, velocity, heading, acceleration, field location, etc. In various other examples, velocity, heading, and acceleration information may be computed based on the changing player location over time (e.g., over frames of the tracking data 104). In various examples, the player location data of tracking data 104 may be provided in the field plane (e.g., a top-down coordinate plane representing the playing field). As such, the player location data may identify an x, y coordinate of each player's current location. In various examples, the player location data may be normalized to make the player location data invariant to heading (e.g., offensive direction). Tracking data 104 may be provided in tracking frames which may correspond to a given amount of time. For example, the tracking data 104 may be captured at a particular frame rate. In some examples, the tracking data may indicate and/or be used to calculate information such as whether a player is on an offensive team or a defensive team, whether the player is currently in possession of the ball, individual statistics or characteristics of a specific player (e.g., player tendencies, top velocity, acceleration, etc.). Taken together, tracking data 104 may represent the formations of the players (e.g., offensive formations, defensive formations, etc.) by representing the positions of individual players, the spaced relationship between players, movements of the players (and the changing and/or deforming formations), etc. As described herein, in some examples, the tracking data 104 representing formations may be represented as a graph neural network where individual players are nodes and offsets between players are represented as edges connecting the nodes.

Metadata service(s) 108 may also provide game state data 110 temporally associated with a game state of each frame of the tracking data 104 (or of a collection of frames of the tracking data 104). Game state data may include information about a current state of the game. In an American football example, the game state data 110 may include information such as current ball location, score, down, yards until first down, yards until end zone, possession, number of timeouts, etc.

One or more frames of the tracking data 104 may be encoded using encoder 112 to generate embedding data 114. The embedding data 114 may be a representation of the current player formation and may also represent other information provided in the tracking data 104 (e.g., player names, team, positions, numbers, etc.). The embedding data 114 may represent the formation of only the offensive team, only the defensive team, or both. In some examples, the game state data 110 may also be input into the encoder 112 in order to generate embedding data 114 that also encodes the current game state (e.g., down, yards until first down, score, time remaining, number of timeouts, etc.).

The embedding data 114 may be generated per-frame of tracking data 104 and/or may be aggregate information from multiple frames (e.g., to account for pre-snap motion and/or to represent a current play including player motions and/or ball motion). In some examples, a batch of embedding data 114 may be generated over the course of a play and the batch of embedding data 114 may be aggregated (e.g., averaged) in order to represent the current play (including motion of the current play). In still other examples, instead of aggregating embeddings of individual frames, the encoder 112 may take sequences of frames as input and may thus determine relationships across frames (such as player movements and/or changing formations). For example, if the encoder 112 is a transformer-based encoder, the encoder 112 may use the attention mechanism to compute attention across different input frames of tracking data 104.

In other examples, the encoder 112 may be a rules-based encoder and/or may be a machine learning-based encoder (e.g., a graph neural network, a bidirectional encoder representations from transformers (BERT)-based encoder, etc.). In various examples, training a machine learning-based encoder 112 may be advantageous as the encoder 112 may learn to generate embedding data 114 that is most suitable for the optimal play prediction.

In the example of FIG. 1, the tracking data 104 is shown as being embedded using encoder 112 to generate embedding data 114 which may, in turn, be input into the supervised classifier 120 and/or the simulation component 122. However, it should be noted that the tracking data 104 (and/or game state data 110) may instead be directly input into the supervised classifier 120 and/or the simulation component 122 (which may optionally include integrated encoders), depending on the desired implementation.

Supervised classifier 120 may be trained using historical play data with training instances that include representations of the tracking data 104 of historical plays (e.g., multiple frames of historical tracking data 104 representing the play from start to finish) labeled with angular direction labels indicating the momentary (e.g., per-frame of tracking data) direction of motion of a ball carrier (or other player of interest) and result data indicating a result of the play (e.g., a number of yards gained, whether a goal was scored, etc.). The supervised classifier 120 may predict the optimal momentary direction of motion (e.g., predicted optimal momentary direction 124) for each frame of the training data. This predicted optimal momentary direction 124 may be compared to the actual momentary direction of motion of the player/ball in the historical play which resulted in optimal result data (e.g., a maximum number of yards gained). The loss may be defined as the difference between the predicted direction and the actual direction taken during a given frame of the historical play (e.g., an angular loss). Various loss functions (e.g., cross-entropy loss) may be used to compute the gradient and perform back propagation to learn optimal model parameters. In some other examples, reinforcement learning may be used by the supervised classifier 120 to predict the optimal momentary direction at each frame of tracking data. The reinforcement learning algorithm may use a policy that rewards momentary directions associated with a positive result (e.g., an increase in the number of yards gained).

After training, the supervised classifier 120 may generate the predicted optimal momentary direction 124 for as few as a single frame of tracking data 104 and/or for a group of frames (depending on the desired implementation). The supervised classifier 120 may generate the predicted optimal momentary direction 124 during the live play, predicting the optimal momentary direction of motion of a player and/or the ball (e.g., a running back carrying the ball) prior to the player potentially moving in that direction to illustrate to viewers a predicted optimal direction. The predicted optimal momentary direction 124 may be updated as more frames of tracking data 104 are sampled, embedded, and input into the supervised classifier 120. The predicted optimal momentary directions 124 may be used to generate real-time graphical overlays 128 illustrating the predicted optimal momentary direction. Since the supervised classifier 120 predicts the optimal momentary direction 124 in the field plane of the tracking data (e.g., in the top-down plane), the real-time graphical overlay 128 may be generated using homography (as described in further detail below in reference to FIG. 3B) so that the correct predicted optimal momentary direction 124 displays correctly in the video (e.g., from the perspective that viewers are seeing as part of the video feed).

Additionally, in some cases, since the predicted optimal momentary direction 124 may be predicted for as few as single, individual frames of tracking data 104, the predictions may be provided at a relatively high rate (e.g., up to a frame rate of the tracking data 104). If each prediction was used to generate a real-time graphical overlay 128, outlier predictions may result in an erratic and/or unpleasing viewer experience. For example, for a batch of ten frames of tracking data 104, a predicted optimal momentary direction of "straight ahead" may be predicted for eight of the ten frames. However, a direction of "hard left" may be predicted for two frames (e.g., due to prediction error). A real-time graphical overlay 128 that shifts rapidly from straight-ahead to hard left may appear erratic and/or flickering. As such, a majority smoothing filter may be used to determine the majority prediction direction among the predicted optimal momentary directions 124 over a batch of frames of tracking data (e.g., over 10 frames, 20 frames, 50 frames, 100 frames, etc.). This may ensure that the real-time graphical overlay illustrates the prevailing predicted optimal momentary direction 124 over a group of frames, resulting in a pleasing visual experience for the viewer.

In addition, in some examples, as the predicted optimal momentary direction 124 is updated as additional tracking data 104 is sampled as the play unfolds, a smoothing filter may generate real-time graphical overlays 128 that show a change in direction as a smoothly rotating arrow. For example, as the predicted optimal momentary direction shifts from straight ahead (e.g., 0°) to slight left (e.g., +45°) to hard left (e.g., +90°), the arrow may rotate smoothly throughout the angular space from 0° to +90° to prevent a jittery, flickering user experience.

In various other examples, the tracking data 104 (e.g., repeatedly sampled in real-time during an on-going play) and/or embedding data 114 representing the tracking data 104 may be sent to a simulation component 122. The simulation component 122 may be a physics-based simulator used to replicate the dynamic player and/or ball information of a sports match (e.g., a football game, basketball game, baseball game, etc.). The simulation component 122 may model the physical interactions between players, the ball (as used herein, a "ball" may also refer to other sports equipment such as a puck in hockey), the playing surface (e.g., field, ice rink, etc.) and may use principles of physics to ensure realistic movement and behavior. In various other examples, the simulation component 122 may be implemented using a supervised machine learning model trained to predict the optimal path given a frame (or a batch of frames) of tracking data representing the current player formation(s)/movement(s).

Additionally, in various examples, the predicted optimal momentary direction 124 and/or the predicted optimal path 126 may be generated using other techniques. For example, a supervised classifier (e.g., a neural network-based classifier), a regression-based transformer, a physics-based simulator, etc., may be used to generate the predicted optimal momentary direction 124 and/or the predicted optimal path 126. For example, a regression task may be used to predict floating point precision numbers representing different angles (where the different angles correspond to different directions of motion in the field plane).

The tracking data may be used to determine individual player models representing player attributes such as speed, agility, strength, stamina, etc. Player movements in the simulation may be governed by physics-based algorithms that are able to simulate running, jumping, tackling, and/or other actions related to the sport. Additionally, the trajectory of the ball (e.g., for kicks and/or passing plays in American football) may be calculated using gravity and air resistance. Weather conditions such as wind and/or precipitation may be used to modify the simulation (e.g., with rain affecting surface friction/traction).

The simulation component 122 may provide one or more sport-specific objectives and/or one or more sport-specific constraints. Examples are now described for American football; however, it should be noted that the specific objectives and/or constraints may vary according to both the sport and the desired implementation. Examples of football objectives may include an objective of a ball carrier (e.g., the quarterback, receiver, running back etc.) to gain as many yards as possible and/or to score during the current play. Examples of football objectives may vary according to different player roles. For a ball carrier, a constraint may be to avoid defensive players (e.g., to avoid intersecting with defensive players in the field plane). For defensive players, a constraint may be to attempt to intersect with the ball carrier and/or to intercept a thrown pass. Another constraint of defensive players may be to attempt to avoid intersecting with other offensive players (e.g., blockers) apart from the ball carrier. Non-ball carriers on the offensive team may attempt to intersect with (e.g., block) defensive players.

The simulation component 122 may use the tracking data 104 sampled from the actual play (while the play is occurring). Similar to the supervised classifier 120, the simulation component 122 may use a batch of frames of tracking data 104 to perform a simulation or a single frame of tracking data 104. In either case, the simulation component 122 may perform multiple simulations during the course of a play (e.g., one for each sampled frame, one for each sampled batch of frames, etc.). The path taken by the ball and/or ball carrier in the simulation may be determined to be the predicted optimal path 126 given that the objective of the ball carrier is to gain the maximum number of yards given the specific player formations and/or movements that are currently present. The predicted optimal path 126 (e.g., the path taken by the ball and/or ball carrier during a given simulation) may be rendered as a real-time graphical overlay 128 to show the predicted optimal route (which can include curved paths and/or changes in direction) as the player in the simulation attempts to evade tacklers and/or gain a maximum number of yards. Additionally, the predicted optimal path 126 may change as the play continues, in real-time. For example, as a play proceeds, additional frames of tracking data 104 are sampled and are used to perform additional simulations reflecting the changing state of the player formations and the player movements. The real-time graphical overlay 128 may be updated accordingly. As previously described, various smoothing filters may be used to prevent a flickering path from being displayed to provide a pleasing viewer experience.

Note that the real-time graphical overlay 128 depicts the optimal path that the ball and/or ball carrier should take to gain the maximum number of yards (or complete some other objective such as getting a first down, scoring, etc.) before the real player actually takes any path. From the viewer perspective, it may be interesting to see when the ball carrier takes the predicted path and, conversely, when the ball carrier deviates from the predicted optimal path. In the context of American football, the simulation component 122 may predict passing plays and running plays. For passing plays, the real-time graphical overlay 128 may show an arced path representing a predicted trajectory of the football and may optionally display a target indicating a predicted spot at which a receiver will catch the ball to maximize the objective.

Figure 2A:
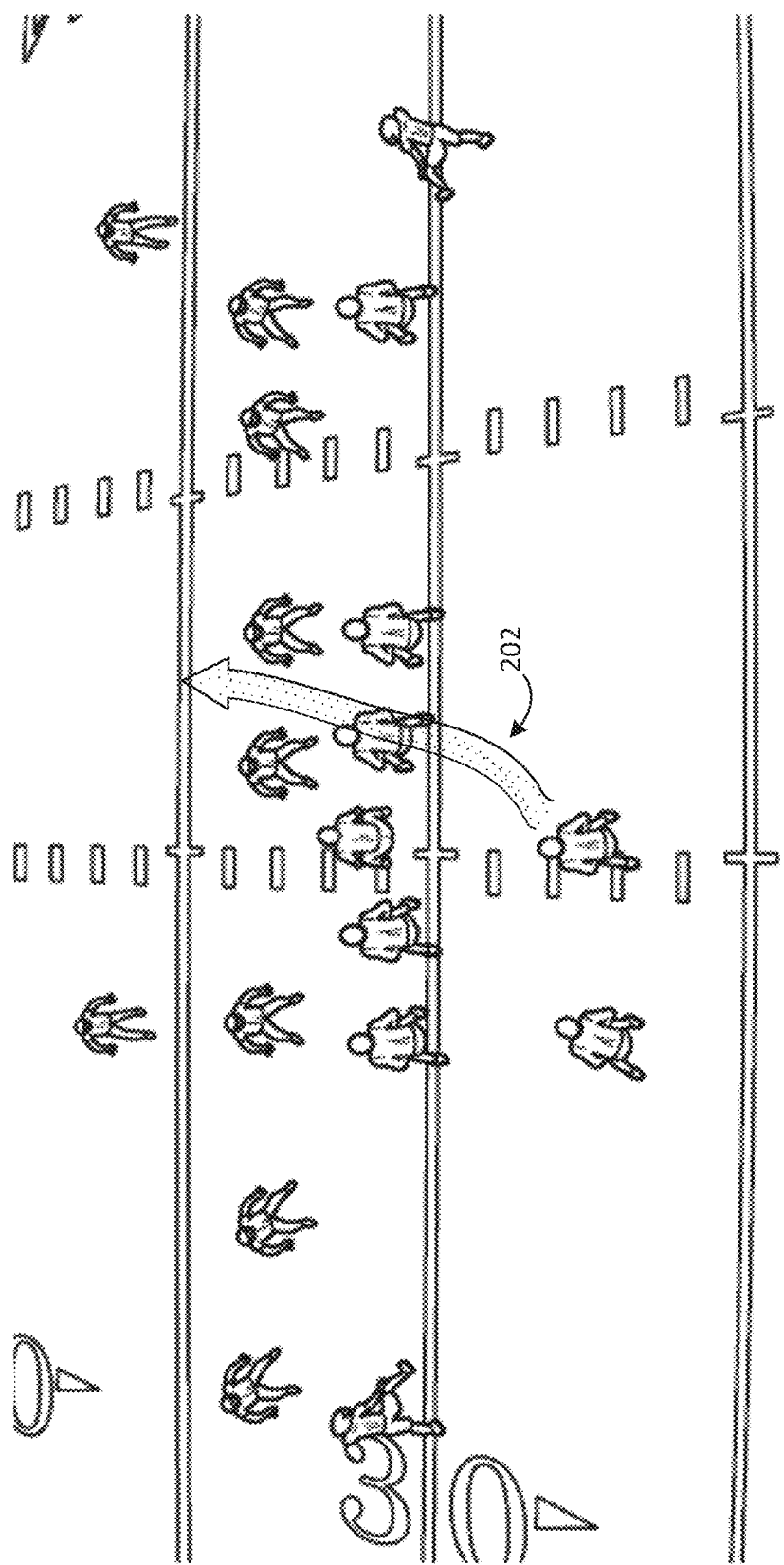
FIG. 2A is a diagram illustrating an example of a real-time predicted optimal path overlay for a video feed of a sporting event, in accordance with various aspects of the present disclosure.

FIG. 2A is a diagram illustrating an example of a real-time predicted optimal path overlay 202 for a video feed of a sporting event, in accordance with various aspects of the present disclosure. The specific appearance of such overlays can vary according to the desired implementation. For example, the path may be of any length, may be semi-transparent, colored, etc. In the example of FIG. 2A, the simulation component 122 may predict that the optimal path is for the quarterback to run through the defensive line slightly right of center, as shown.

Figure 2B:
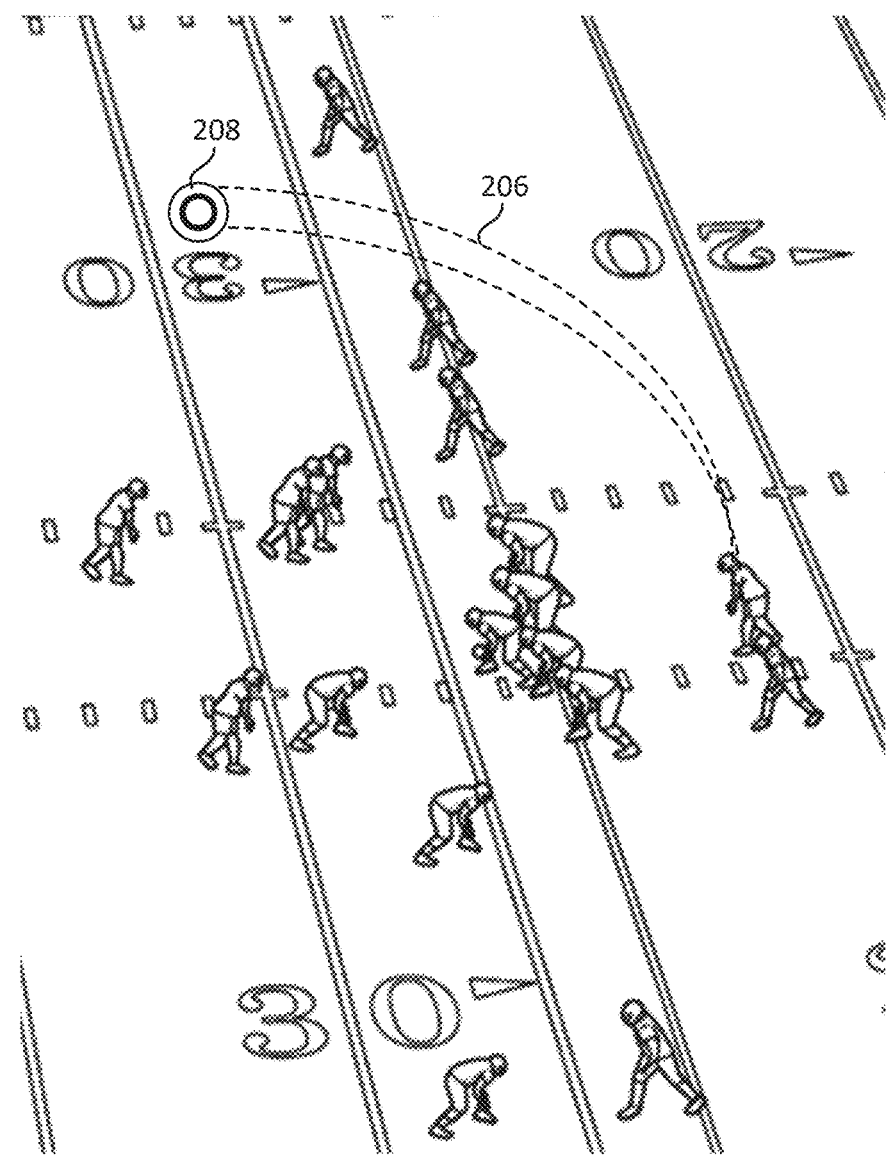
FIG. 2B is a diagram illustrating an example of a real-time predicted optimal pass overlay for a video feed of a sporting event, in accordance with various aspects of the present disclosure.

FIG. 2B is a diagram illustrating an example of a real-time predicted optimal pass overlay for a video feed of a sporting event, in accordance with various aspects of the present disclosure. The perspective of the viewer in FIG. 2B is different relative to the perspective shown in FIG. 2A. However, the various real-time graphical overlays described herein (representing predicted optimal paths and/or predicted momentary direction of motion) may be projected into any view using homographic techniques to project from the field plane of the tracking data and the prediction into the video plane. In FIG. 2B, the simulation component 122 has predicted that the quarterback will throw a pass that will be received at the target reception point 208. The real-time graphical overlay (e.g., real-time graphical overlay 128) may display the predicted optimal flight path of the thrown pass as an arced path 206 and may optionally display a marker superimposed on the field as a predicted target reception point 208 at which a receiver is predicted to catch the ball. These real-time graphical overlays may be smoothly modified in real-time as further simulations are run that reflect the ever-changing game conditions while the play is being run.

Figure 2C:
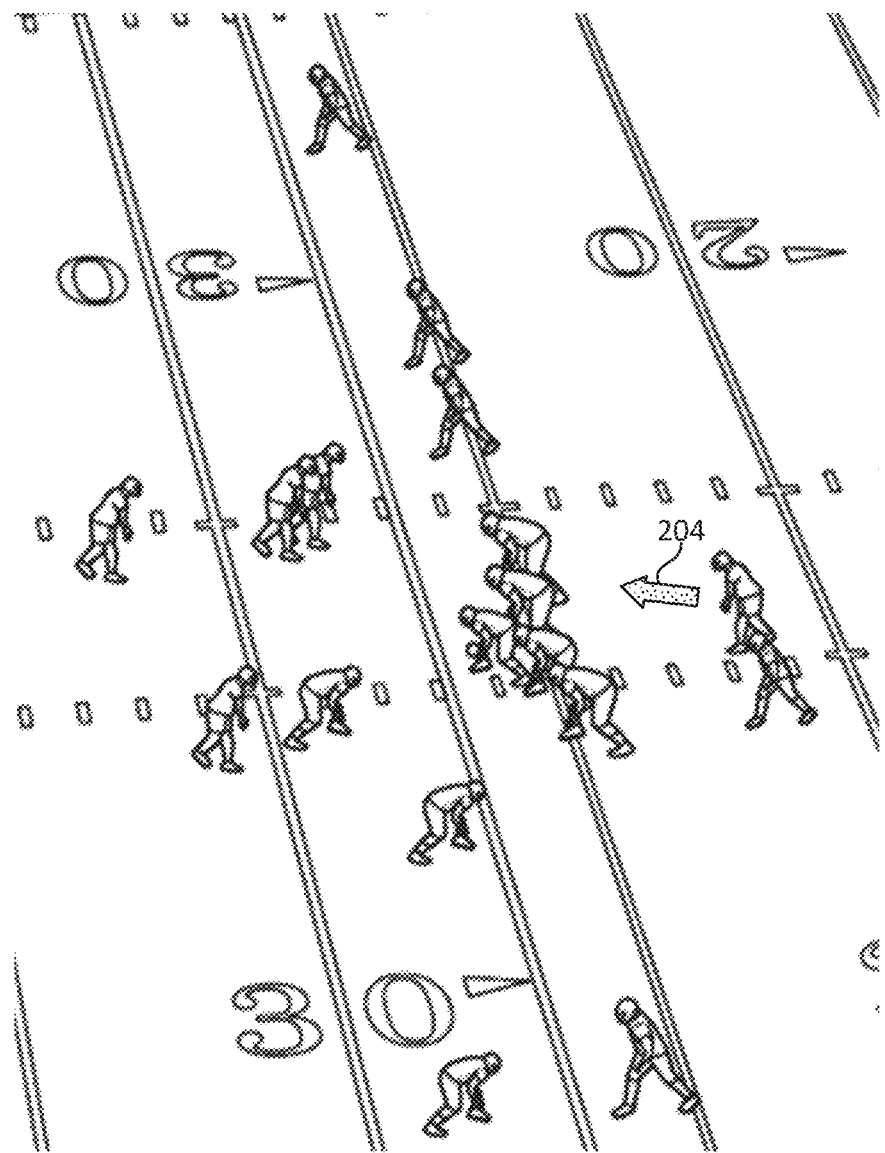
FIG. 2C is a diagram illustrating an example of a real-time predicted optimal momentary direction of motion overlay for a video feed of a sporting event, in accordance with various aspects of the present disclosure.

FIG. 2C is a diagram illustrating an example of a real-time predicted optimal momentary direction of motion overlay 204 for a video feed of a sporting event, in accordance with various aspects of the present disclosure. The momentary direction of motion illustrated using the momentary direction of motion overlay 204 may be predicted, for one or more sampled frames of tracking data 104, by supervised classifier 120. The real-time predicted optimal momentary direction of motion overlay 204 may be continually updated during the play as additional frames of tracking data 104 are sampled and input into the encoder 112 and/or supervised classifier 120. The specific illustration of the real-time predicted optimal momentary direction of motion overlay 204 may vary according to the desired implementation. For example, the real-time predicted optimal momentary direction of motion overlay 204 may instead by shown as a chevron or directional indicator on a comet-tail style line that is displayed along the route that the ball carrier has taken to indicate the optimal direction in which the player may take to maximize the relevant objective. In the example shown, the real-time predicted optimal momentary direction of motion overlay 204 is rendered in front of the player to show the predicted optimal direction that the player may take. However, the real-time predicted optimal momentary direction of motion overlay 204 may instead be rendered behind the player. The real-time predicted optimal momentary direction of motion overlay 204 may be any desired shape, any desired color, of any desired translucency and/or opacity, etc.

Figure 2D:
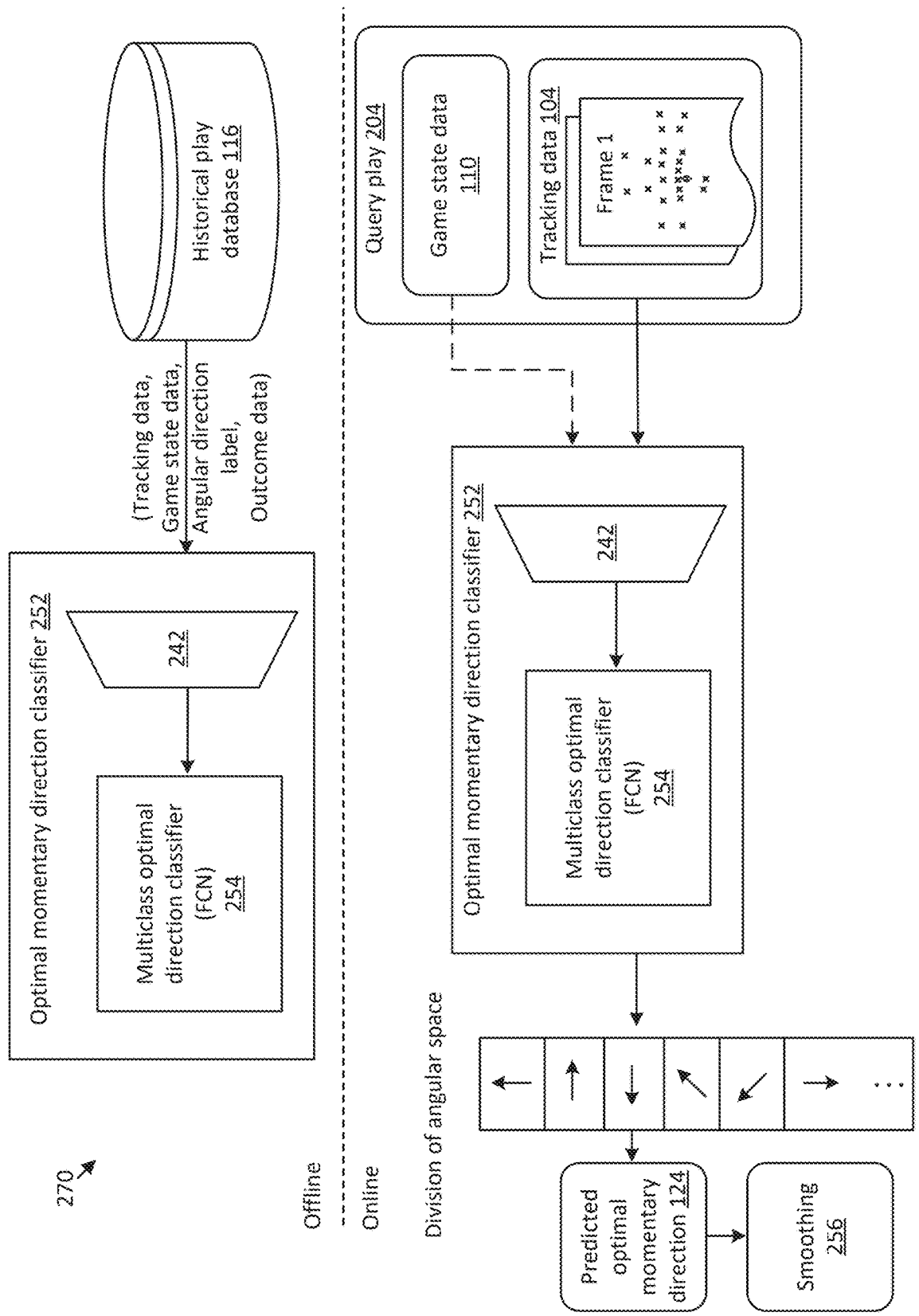
FIG. 2D is a diagram illustrating an example system for predicting optimal momentary direction of movement during a live video feed of a sporting event, in accordance with various aspects of the present disclosure.

FIG. 2D is a diagram illustrating an example system 270 for predicting optimal momentary direction of movement during a live video feed of a sporting event, in accordance with various aspects of the present disclosure. System 270 is shown in both offline (e.g., training) mode and online (e.g., inference) mode. The optimal momentary direction classifier 252 may be an example of the supervised classifier 120 described above in reference to FIG. 1. However, as previously described, the optimal momentary direction classifier 252 may instead be implemented using regression and/or a physics-based simulator.

In offline mode, the optimal momentary direction classifier 252 (which may include both an encoder 242 (e.g., a transformer-based encoder such as BERT) and a multiclass optimal direction classifier (e.g., a fully-connected network (FCN)) 254 may be trained using historical play data from the historical play database 116. The historical play database may store training instances that include representations of the tracking data 104 of historical plays (e.g., multiple frames of historical tracking data 104 representing the play from start to finish) labeled with angular direction labels indicating the momentary (e.g., per-frame of tracking data) direction of motion of a ball carrier (or other player of interest), and result data (e.g., outcome data) indicating a result of the play (e.g., a number of yards gained, whether a goal was scored, etc.). The optimal momentary direction classifier 252 may predict the optimal momentary direction of motion (e.g., predicted optimal momentary direction 124) for each frame (or batch of frames) of the training data. This predicted optimal momentary direction may be compared to the actual momentary direction of motion of the player/ball in the historical play which resulted in optimal result data (e.g., a maximum number of yards gained). The loss may be defined as the difference between the predicted direction and the actual direction taken during a given frame of the historical play (e.g., an angular loss). Various loss functions (e.g., cross-entropy loss) may be used to compute the gradient and perform back propagation to learn optimal model parameters. In some other examples, reinforcement learning may be used by the optimal momentary direction classifier 252 to predict the optimal momentary direction at each frame of tracking data. The reinforcement learning algorithm may use a policy that rewards momentary directions associated with a positive result (e.g., an increase in the number of yards gained).

After training, during online mode, the optimal momentary direction classifier 252 may generate the predicted optimal momentary direction 124 for as few as a single frame of tracking data 104 and/or for a batch of frames (depending on the desired implementation) of the query play 204. The optimal momentary direction classifier 252 may generate the predicted optimal momentary direction 124 during the live play, predicting the optimal momentary direction of motion of a player and/or the ball (e.g., a running back carrying the ball) prior to the player potentially moving in that direction to illustrate to viewers a predicted optimal direction. As shown, in some examples, the optimal momentary direction classifier 252 may be trained to take game state data 110 as an additional input (in addition to the tracking data 104) so that the optimal momentary direction classifier 252 is able to take into account different game scenarios (e.g., end of the half, end of the fourth quarter, score differential, etc.). In some examples, other historical play data may be used as part of the query play 204. For example, historical information about a given player (e.g., average velocity, average yards gained for a particular situation, etc.) may be used to reflect individual player attributes and/or impacts on a given play. The predicted optimal momentary direction 124 may be updated as more frames of tracking data 104 are sampled, embedded, and input into the optimal momentary direction classifier 252. The predicted optimal momentary directions 124 may be used to generate real-time graphical overlays 128 illustrating the predicted optimal momentary direction. Since the optimal momentary direction classifier 252 predicts the optimal momentary direction 124 in the field plane of the tracking data (e.g., in the top-down plane), the real-time graphical overlay 128 may be generated using homography (as described in further detail below in reference to FIG. 3B) so that the correct predicted optimal momentary direction 124 displays correctly in the video (e.g., from the perspective that viewers are seeing as part of the video feed).

Additionally, in some cases, since the predicted optimal momentary direction 124 may be predicted for as few as single, individual frames of tracking data 104, the predictions may be provided at a relatively high rate (e.g., up to a frame rate of the tracking data 104). If each prediction was used to generate a real-time graphical overlay 128, outlier predictions may result in an erratic and/or unpleasing viewer experience. For example, for a batch of ten frames of tracking data 104, a predicted optimal momentary direction of "straight ahead" may be predicted for eight of the ten frames. However, a direction of "hard left" may be predicted for two frames (e.g., due to prediction error). A real-time graphical overlay 128 that shifts rapidly from straight-ahead to hard left may appear erratic and/or flickering. As such, smoothing component 256 may be used to perform various types of smoothing. For example, a majority smoothing filter may be used to determine the majority prediction direction among the predicted optimal momentary directions 124 over a batch of frames of tracking data (e.g., over 10 frames, 20 frames, 50 frames, 100 frames, etc.). This may ensure that the real-time graphical overlay illustrates the prevailing predicted optimal momentary direction 124 over a group of frames, resulting in a pleasing visual experience for the viewer.

In addition, in some examples, as the predicted optimal momentary direction 124 is updated as additional tracking data 104 is sampled as the play unfolds, a smoothing filter may generate real-time graphical overlays 128 that show a change in direction as a smoothly rotating arrow. For example, as the predicted optimal momentary direction shifts from straight ahead (e.g., 0°) to slight left (e.g., +45°) to hard left (e.g., +90°), the arrow may rotate smoothly throughout the angular space from 0° to +90° to prevent a jittery, flickering user experience.

As shown in FIG. 2D, the angular space (from a (0, 0) origin coordinate point in the field plane) may be divided into one or more angular "buckets" or "bins" with each corresponding to a portion of the 360° angular space. The origin coordinate point may be selected as the ball, the ball carrier, etc. In the example of FIG. 2D the angular space is divided into a straight ahead arrow (e.g., +0°), a hard right arrow (e.g., +90°), a hard left arrow (e.g., −90°), a soft right arrow (e.g., +45°), a soft left arrow (e.g., −45°), and a backwards arrow (e.g., +/−180°). In this example, predictions of the optimal momentary direction classifier 252 may be limited to one of these discrete bins. However, other implementations are possible (including implementations where the optimal momentary direction classifier 252 predicts continuous values for the angular space.

Figure 2E:
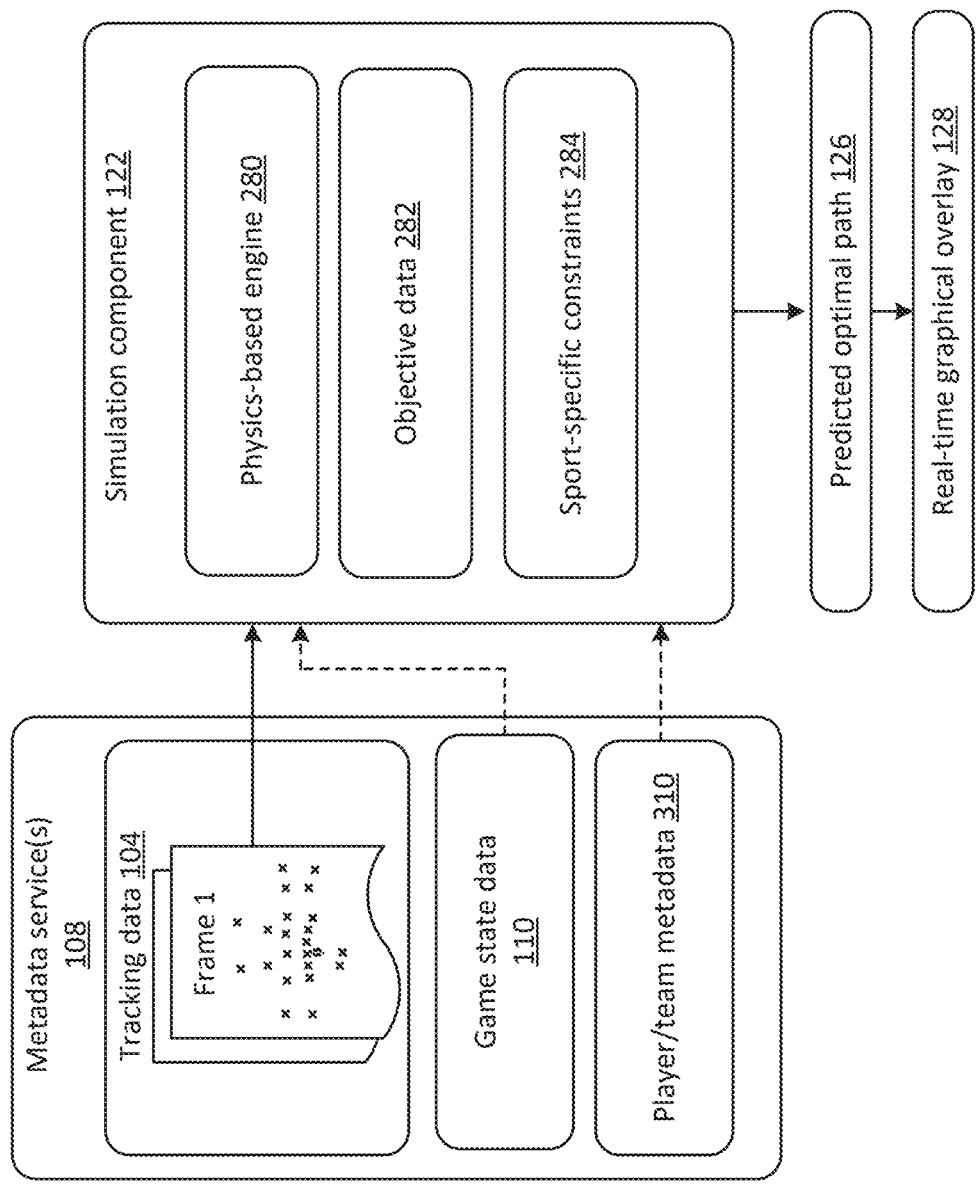
FIG. 2E is a diagram illustrating an example system for simulating a play from a current game state to determine an optimal path, in accordance with various aspects of the present disclosure.

FIG. 2E is a diagram illustrating an example system for simulating a play from a current game state to determine an optimal path, in accordance with various aspects of the present disclosure. In various other examples, the tracking data 104 (e.g., repeatedly sampled in real-time during an on-going play) and/or embedding data 114 representing the tracking data 104 may be sent to the simulation component 122. The simulation component 122 may be a physics-based simulator used to replicate the dynamic player and/or ball information of a sports match (e.g., a football game, basketball game, baseball game, etc.). The simulation component 122 may model the physical interactions between players, the ball (as used herein, a "ball" may also refer to other sports equipment such as a puck in hockey), the playing surface (e.g., field, ice rink, etc.) and may use principles of physics to ensure realistic movement and behavior. As shown in FIG. 2E, in addition to the tracking data 104, other metadata may be optionally sent to the simulation component 122. For example, game state data 110 reflecting such real-time game information as the current score, the current time remaining, the current half, quarter, period, inning, etc., of the game, the current down, the current number of timeouts remaining, etc. Additionally, player/team metadata 310 may be sent to the simulation component 122. Examples of player/team metadata 310 may include information related to team tendencies (e.g., plays commonly called in a particular situation by a particular coach), player attributes/tendencies (e.g., a player that tends to drive to the right in basketball), recent player data (e.g., metadata indicating that a player that has made several consecutive shots), etc.

The tracking data and/or other metadata may be used by the simulation component 122 to determine individual player models representing player attributes such as speed, agility, strength, stamina, etc. Player movements in the simulation may be governed by physics-based algorithms employed by physics-based engine 280 that are able to simulate running, jumping, tackling, and/or other actions related to the sport. Additionally, the trajectory of the ball (e.g., for kicks and/or passing plays in American football) may be calculated using gravity and air resistance. Weather conditions such as wind and/or precipitation may be used to modify the simulation (e.g., with rain affecting surface friction/traction).

The simulation component 122 may provide one or more sport-specific objectives as objective data 282 and/or one or more sport-specific constraints as sport-specific constraints 284. Examples are now described for American football; however, it should be noted that the specific objectives and/or constraints may vary according to both the sport and the desired implementation. Examples of football objectives may include an objective of a ball carrier (e.g., the quarterback, receiver, running back etc.) to gain as many yards as possible, to score during the current play, to gain a first down, to stop the clock, etc. Examples of football objectives (of objective data 282) may vary according to different player roles. For a ball carrier, a constraint may be to avoid defensive players (e.g., to avoid intersecting with defensive players in the field plane). For defensive players, a constraint may be to attempt to intersect with the ball carrier and/or to intercept a thrown pass. Another constraint of defensive players may be to attempt to avoid intersecting with other offensive players (e.g., blockers) apart from the ball carrier. Non-ball carriers on the offensive team may attempt to intersect with (e.g., block) defensive players.

The simulation component 122 may use the tracking data 104 sampled from the actual play (while the play is occurring). Similar to the supervised classifier 120, the simulation component 122 may use a batch of frames of tracking data 104 to perform a simulation or a single frame of tracking data 104. In either case, the simulation component 122 may perform multiple simulations during the course of a play (e.g., one for each sampled frame, one for each sampled batch of frames, etc.). The path taken by the ball and/or ball carrier in the simulation may be determined to be the predicted optimal path 126 given that the objective of the ball carrier is to gain the maximum number of yards given the specific player formations and/or movements that are currently present. The predicted optimal path 126 (e.g., the path taken by the ball and/or ball carrier during a given simulation) may be rendered as a real-time graphical overlay 128 to show the predicted optimal route (which can include curved paths and/or changes in direction) as the player in the simulation attempts to evade tacklers and/or gain a maximum number of yards. Additionally, the predicted optimal path 126 may change as the play continues, in real-time. For example, as a play proceeds, additional frames of tracking data 104 are sampled and are used to perform additional simulations reflecting the changing state of the player formations and the player movements. The real-time graphical overlay 128 may be updated accordingly. As previously described, various smoothing filters may be used to prevent a flickering path from being displayed to provide a pleasing viewer experience. For example, a first curve (representing a first predicted optimal path) may be smoothly transitioned to a second curve (representing a second, modified predicted optimal path). For example, a first number of points may be sampled from each curve, then each point of the first curve may be smoothly transitioned (e.g., linearly) from the first curve to the corresponding point in the second curve in order to smoothly "morph" the first curve into the second curve.

Note that the real-time graphical overlay 128 depicts the optimal path that the ball and/or ball carrier should take to gain the maximum number of yards (or complete some other objective such as getting a first down, scoring, etc.) before the real player actually takes any path. From the viewer perspective, it may be interesting to see when the ball carrier takes the predicted path and, conversely, when the ball carrier takes a different path from what has been predicted as optimal. In the context of American football, the simulation component 122 may predict passing plays and running plays. For passing plays, the real-time graphical overlay 128 may show an arced path representing a predicted trajectory of the football and may optionally display a target indicating a predicted spot at which a receiver will catch the ball to maximize the objective.

The homography system used to perform the homography techniques described herein may be any software (e.g., machine learning models, artificial neural network, computer executable instructions, computer vision software, You Only Look Once (YOLO), etc.), firmware, dedicated hardware (e.g., application specific integrated circuit (ASIC), system on chip (SoC), complex programmable logic device (CPLD), etc.), and/or the like as described herein for, at least in part, applying transformations between different views (e.g., of videos, image planes, etc.) to map points from at least one image plane to a planar surface. In some examples, the homography system may be configured to identify and/or map points in a first plane to a second plane. For example, the homography system may identify points on a field in a video plane viewed from a 45° angle from the ground and the homography system may identify the same points on the field in a second image plane from a top-down view (e.g., the field plane, a 90° angle from the ground, overhead, etc.). In some such examples, the homography system may map the identified points that are common to each image plane to determine a spatial relationship between the first image plane and the second image plane. In some examples, the homography system may map common points in two or more image planes to a common spatial plane (e.g., a flat 2D or top-down model of a space shown in both image planes). For example, a soccer field may be captured by two or more cameras (e.g., any or all of cameras) from different angles and the homography system may map at least one image (e.g., video frame, etc.) from the perspective of each camera to a 2D model of the soccer field. In some such examples, the 2D model may be generated using planar coordinate data (e.g., GPS coordinates, etc.) provided by the metadata service(s) 108.

Figure 3A:
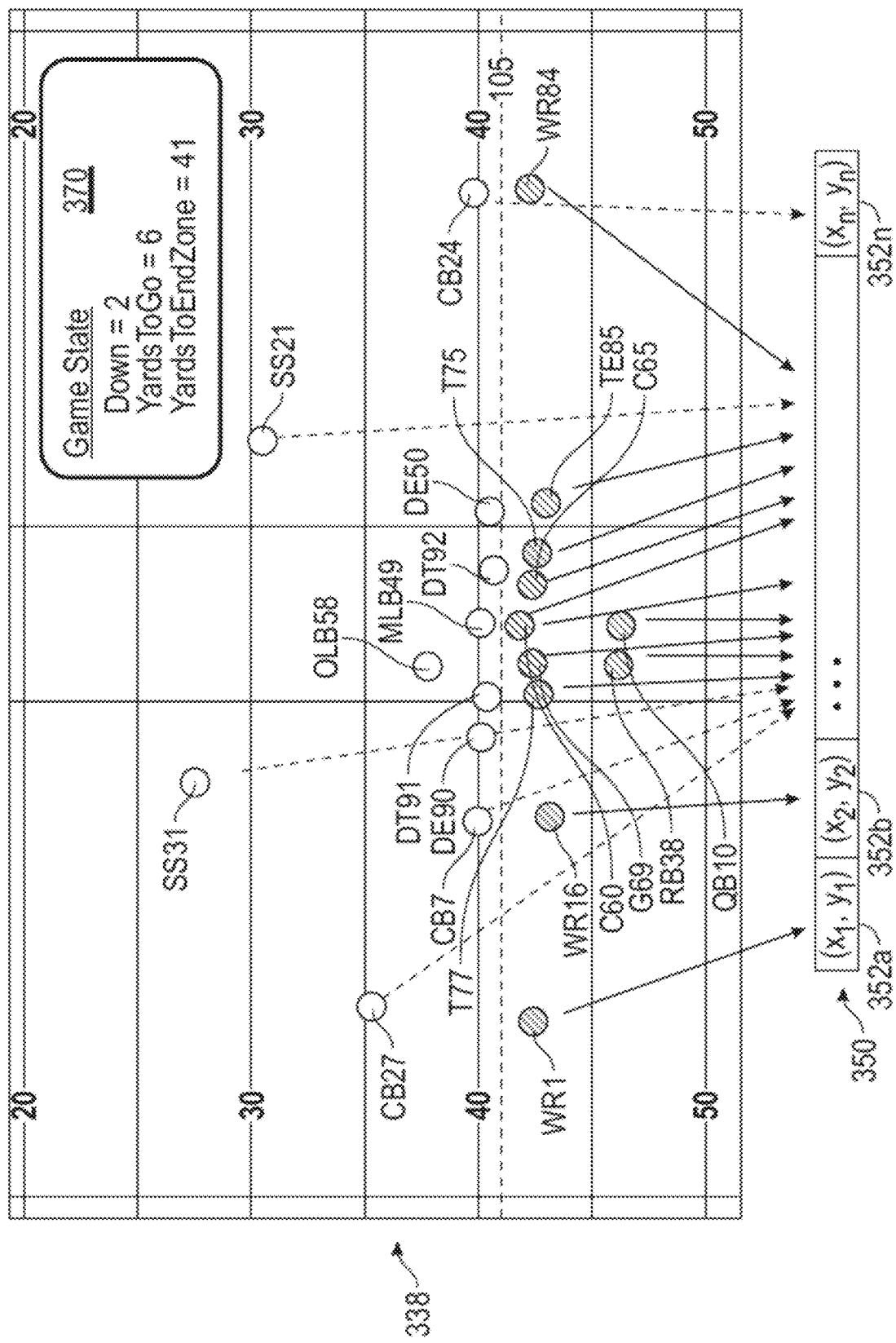
FIG. 3A depicts an example encoding of tracking data to generate an embedding data that may be used, in some examples, to predict optimal player motion, in accordance with various aspects of the present disclosure.

FIG. 3A depicts an example encoding of tracking data to generate an embedding data that may be used, in some examples, to predict the predicted optimal momentary direction 124 and/or to perform a simulation by the simulation component 122, etc., in accordance with various aspects of the present disclosure. In the example depicted in FIG. 3A, a frame of tracking data 338 represents locations of individual offensive and defensive players on the field plane at a given time (e.g., during lineup pre-snap). The tracking data 338 may also represent information such as player names, player numbers, positions, whether a player possesses the ball, etc. The tracking data may be associated with game state data 370 (in the example shown in FIG. 3A, the game state data 370 includes the down (2), the yards to go for a first down (6), and the yards to the end zone (41)).

In one example instantiation of the encoder 112 (and/or the encoder 242), the x, y coordinate of each player in the filed plane may be concatenated to generate a vector embedding 350. In the example of FIG. 3A, a first player (e.g., a wide receiver on the offensive team) is associated with a first x, y coordinate on the field plane (e.g., $(\chi_1, y_1)$) in the tracking data 338. Accordingly, this coordinate value may be stored as a first element 352a of the vector. In some examples, the x coordinate and y coordinate may be stored as separate elements of the vector embedding 350; however, in the example of FIG. 3A the 2D coordinate location is shown in a single element of the vector embedding 350, for simplicity. Similarly, a second player (e.g., another wide receiver on the offensive team) is associated with a second x, y coordinate on the field plane (e.g., $(x_2, y_2)$) in the tracking data 338. Accordingly, this coordinate value may be stored as a second element 352b of the vector embedding 350, and so on, until element 352n. In various examples, the set of the elements of the vector embedding 350 may correspond to the offensive team and the remaining elements of the vector embedding 350 may correspond to the defensive team (e.g., culminating in the final coordinate of a defensive player $(x_n, y_n)$. However, it should be noted that the vector embedding 350 may store other information, such as position designations, offensive team and defensive team designations, current ball location, current yard line, etc. Accordingly, one or more elements of the vector embedding 350 may represent game state data (in addition to the player positions).

As the 2D field plane locations of each player are encoded by the vector embedding 350, the vector embedding 350 also encodes the spatial relationships between all the players and can be used to search an embedding database (e.g., historical play database 116) for similar historical plays, as previously described herein. It should be noted that concatenating individual player coordinates to generate the vector embedding 350 is merely one example of an operation that can be performed (e.g., by encoder 112) to embed team formation information (and/or other information) for similar historical play retrieval.

In a different example instantiation of encoder 112 (not shown), a graph neural network (GNN) may be used to encode the team formations. For example, a 2D point may be used to represent each player's current location in the tracking data 338. Each 2D point may represent a node in a graph. Edges between nodes may be formed based on spatial relationships (which may be distance-based in the coordinate system of the field plane). The relationships can be binary (e.g., connected or not) and nodes associated with offensive players may be connected, while being unconnected to nodes associated with defensive players, and vice versa. In various further examples, each node may also be assigned a feature vector representing the properties of that node. Such properties may be, for example, a position, a name, a number, whether the player is an eligible receiver, game state data, etc. A GNN's architecture is designed to learn from the graph topology and node features. Common layers in GNNs may include graph convolutional networks (GCNs), graph attention networks (GAT), and/or message passing neural networks (MPNNs).

In message passing, in each layer, the nodes aggregate information from their neighboring nodes through a process called message passing, which involves transforming and combining feature vectors from adjacent nodes and edges. The message passing process enables each node to learn about its local graph structure and can ultimately be used to encode global graph properties.

Training of a graph neural network may comprise adjusting the GNN parameters to minimize a loss function, which may measure the difference between the network's output and the true (ground truth) values for the training task. The learning task may be a graph-level regression or classification task wherein the graph representation is used to retrieve the same historical play, during training. Loss may be calculated when different plays are retrieved and may be used to adjust parameters of the GNN. After training, the GNN may be used to generate embedding data for current plays (e.g., query play 204) so that the most similar historical plays may be retrieved. The most similar historical plays may be retrieved because the GNN embeddings represent the learned representations that may capture both the intrinsic properties of the nodes as well as their spatial relationships.

As previously described, the embedding data for team formations described herein may be encoded over multiple time steps (e.g., over multiple frames of tracking data) such that the embedding data (or batches of embeddings) may represent the changes in the team formations over multiple time steps (e.g., over the course of a play) and may thus represent team motion and/or shifting formations. In still other examples, the encoder 112 and/or 242 may be a transformer-based encoder that may be able to take a sequence of one or more tracking data 104 frames as input and embed the frames (e.g., as a sequence of embeddings and/or as an aggregated embedding for multiple input frames). The specific instantiation of the encoders 112 and/or 242 may vary according to the desired implementation.

Figure 3B:
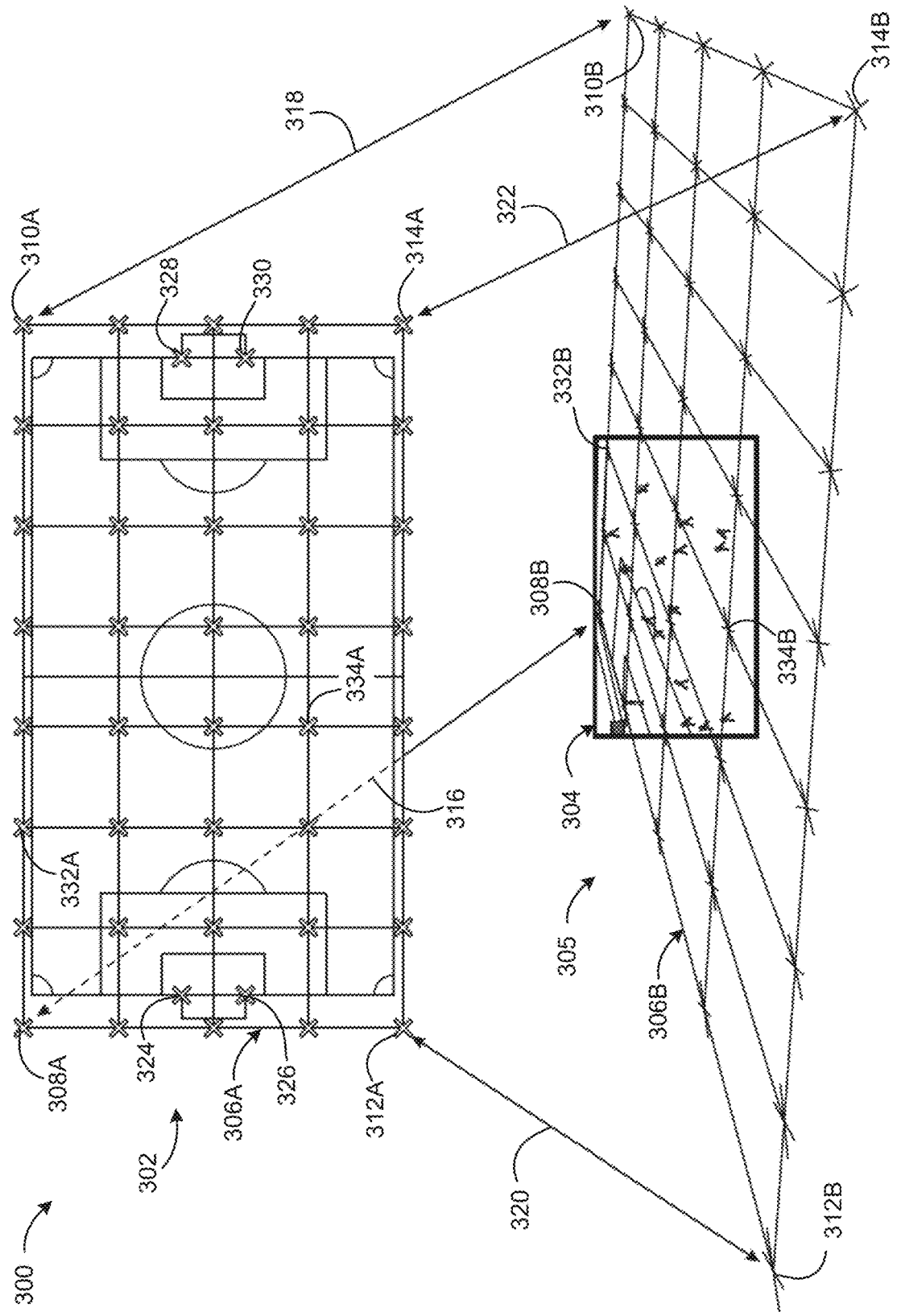
FIG. 3B depicts an example of projection from video coordinate plane to a field coordinate plane, that may be used to generate real-time graphical overlays in accordance with various aspects of the present disclosure.

FIG. 3B depicts an example of projection from video coordinate plane to a field coordinate plane, in accordance with various aspects of the present disclosure. As shown, homography 300 is a projective transformation between two or more planes that maps the two or more planes based on a plurality of common (or shared) points. Homography 300, as shown, comprises a planar coordinate system 302 (e.g., of the field plane) mapped to an image plane 305 of a video frame 304. In some examples, as depicted in FIG. 3B, the planar coordinate system 302 may be overlayed on a soccer field. In other examples, the planar coordinate system 302 may be overlayed on any sporting venue (e.g., a hockey rink, football field, baseball field, etc.). In some examples, a homography matrix (e.g., for homography 300 or the like described herein) may be applied between any planar coordinate system and the image plane of any video frame that share common points (e.g., identifiable features, coordinates, etc.).

The planar coordinate system 302, as shown, may be any coordinate system (e.g., x-y coordinates, RFID receiver locations, GPS coordinates, etc.). In some examples, metadata service(s) 108 (shown in FIG. 1) may be configured to generate (or define) one or more points of the planar coordinate system 302 for a sports venue (e.g., soccer field, hockey rink, etc.). For example, the planar coordinate system 302 may generate a plurality of GPS coordinate points (e.g., the plurality of points each represented in FIG. 3B with an "X") at fixed intervals across a field, rink, and/or the like as described herein. In some such examples, the planar coordinate system 302 may comprise (or define) coordinates for specific features (e.g., goalposts, boundaries, etc.) on the field, rink, and/or the like.

As shown, planar coordinate system 302 comprises a plurality of points (each represented in FIG. 3B with an "X") comprising point 308A, point 310A, point 312A, point 314A, point 324, point 326, point 328, point 330, point 332A, and point 334A. As shown, point 308A, point 310A, point 312A, point 314A are each located at a respective corner of planar coordinate system 302. Additionally, point 324, point 326, point 328, and point 330 are each located at coordinates representing the location of goalposts (i.e., the sides of one or more soccer goals in the depicted example). Additionally, or alternatively, planar coordinate system 302 may comprise a plurality of gridlines (e.g., gridline 306A) connecting one or more points in the coordinate system (e.g., of the field plane coordinate system). In some examples, a homography system performing homography 300 may generate a template comprising the plurality of gridlines (e.g., gridline 306A) and the plurality of points (e.g., point 308A, point 334A, point 326, etc.) and may use this template to map the homography to a plurality of video frames.

The video frame 304, as shown, comprises a scene of a soccer match on a soccer field. In addition, video frame 304 comprises (or defines) an image plane 305 which represents the soccer field from the perspective (e.g., viewing angle) of the camera capturing the video. In the depicted example, video frame 304 comprises point 308B, point 332B, and point 334B which correspond to point 308A, point 332A, and point 334A respectively in planar coordinate system 302. In some examples, the homography system performing homography 300 may detect shared (or common) points between a video frame (e.g., video frame 304 or the like) and a planar coordinate system (e.g., planar coordinate system 302 or the like) to map the planar coordinate system to an image plane of the video frame. In the depicted example, the homography system may identify point 308B, point 332B, point 334B, and/or any other points (or features) shown in the video frame 304 to match the video frame 304 to the planar coordinate system 302.

Additionally, or alternatively, the homography system may map (or align) the points of planar coordinate system 302 with the points of video frame 304. For example, the homography system may transform (e.g., stretch, rotate, compress, translate, etc.) planar coordinate system 302 to align it with the video frame 304. For example, as shown, point 308A is translated (and/or rotated) along mapping line 316 to align with point 308B in video frame 304. It should be noted that point 332A and point 334A are similarly translated (and/or rotated) along their respective mapping lines (not shown). Further, it should be noted that a plurality of points between the planar coordinate system 302 and the video frame 304 may be aligned (or mapped) to ensure that planar coordinate system 302 is overlaid on video frame 304 in the correct proportions. As shown, points outside of video frame 304 may be aligned relative to the points within video frame 304 to generate a full mapping between planar coordinate system 302 and video frame 304. In the illustrated example, point 310A is translated along mapping line 318 to point 310B, point 312A is translated along mapping line 320 to point 312B, and point 314A is translated along mapping line 322 to point 314B. It should be noted that this process may be performed for any or all points of planar coordinate system 302. Additionally, or alternatively, a plurality of gridlines (e.g., gridline 306A) of the planar coordinate system 302 may be translated to the image plane 305. For example, as shown, gridline 306A of the planar coordinate system 302 may be translated to the gridline 306B in the image plane 305. In some examples, the homography system may use homography lines comprising a plurality of points to map a field plane to one or more image planes (from one or more video frames). The homography system may be used to transform the real-time graphical overlays 128 representing the predicted optimal momentary direction 124 and/or the predicted optimal paths 126 from the field plane of the tracking data 104 into the video plane for viewing by viewers of the video feed.

Figure 4:
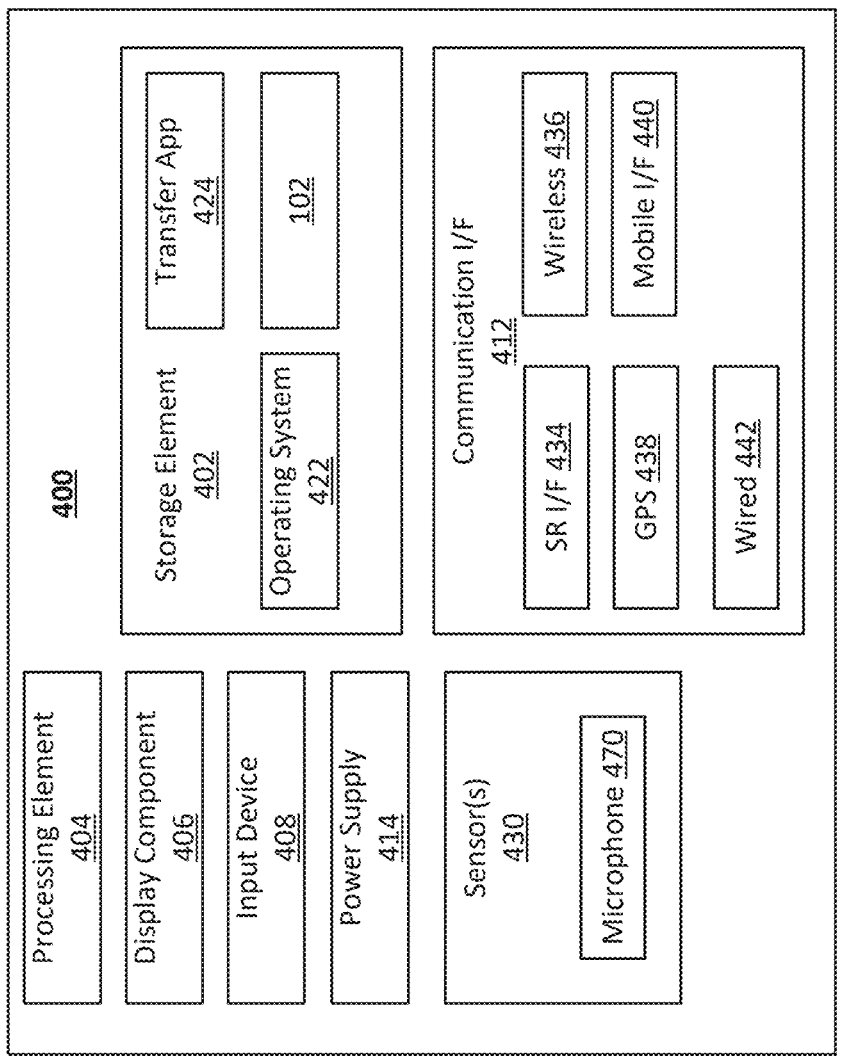
FIG. 4 is a block diagram showing an example architecture of a computing device that may be used in accordance with various aspects of the present disclosure.

FIG. 4 is a block diagram showing an example architecture 400 of a computing device, such as computing device(s) implementing the optimal play prediction component 102, and/or other computing devices described herein. It will be appreciated that not all user devices will include all of the components of the architecture 400 and some user devices may include additional components not shown in the architecture 400. The architecture 400 may include one or more processing elements 404 (e.g., processors) for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to perform automatic synchronization of video data and tracking data, as described above. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the user device and may facilitate communications and commands between applications executing on the architecture 400 and various hardware thereof. A transfer application 424 may be configured to send and/or receive image and/or video data to and/or from other devices (e.g., a mobile device, remote device, image capture device, and/or display device). In some examples, the transfer application 424 may also be configured to upload the received images to another device that may perform processing as described herein (e.g., a mobile device or another computing device). In various examples, storage element 402 may include optimal play prediction component 102 and/or encoder 112 and/or 242, and/or computer-executable instructions for performing the various operations described herein for similar play retrieval, play vulnerability determination, etc. The optimal play prediction component 102 and/or the encoder 112 and/or 242 may generate the embedding data and/or perform retrieval of similar historical plays. In some examples, the architecture 400 may be implemented on a camera device that captures the video data, while in other examples the tracking data 104 may be received from other computing devices and the architecture 400 may execute the similar historical play retrieval component 102 to retrieve similar historical plays, as described herein.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 for capturing sounds, such as voice commands.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other user devices. For example, the communication interface 412 may comprise a wireless communication module 436 configured to communicate on a network, such as the network 105, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol. The architecture 400 may also include one or more other sensors 430 such as, for example, one or more position sensors, image sensors, and/or motion sensors.

Figure 5:
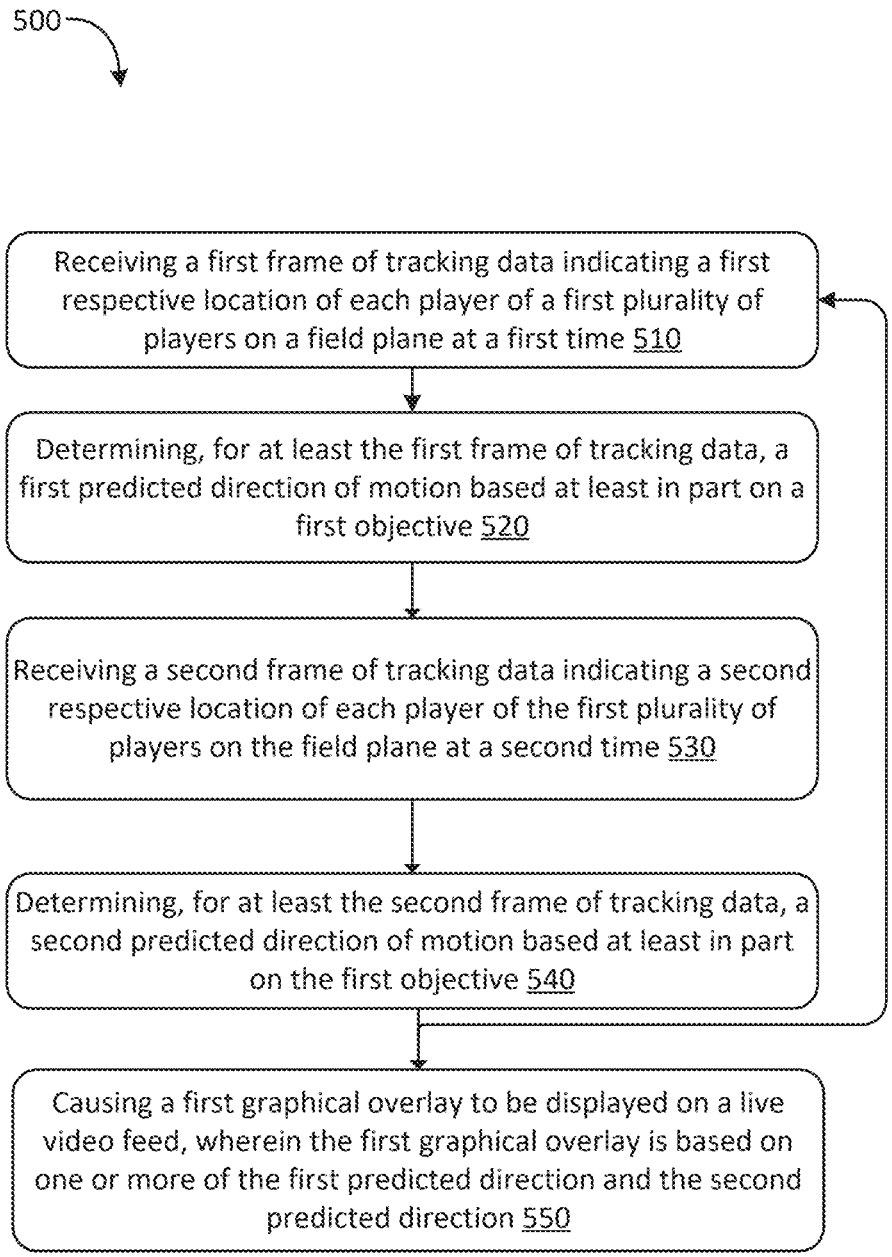
FIG. 5 depicts an example process for predicting a direction of motion, in accordance with various examples described herein.

FIG. 5 depicts an example process 500 for predicting a direction of motion, in accordance with various examples described herein. The actions of the process 500 may represent a series of instructions comprising computer readable machine code (e.g., computer executable instructions stored in computer readable media) executable by a processing unit of similar historical play retrieval component 102, although various operations may be implemented in hardware, as desired. In various examples, the computer readable machine codes may be comprised of instructions selected from a native instruction set of the processor(s) and/or an operating system of the computing device.

Process 500 may begin at action 510, at which a first frame of tracking data indicating a first respective location of each player of a first plurality of players on a field plane at a first time may be received. The first frame of tracking data may be received together with other frames of tracking data representing the respective locations of the first plurality of players over multiple time steps. The first plurality of players may be from the same team or different teams.

Additionally, while many examples discussed herein discuss American football, it should be noted that the various historical play retrieval techniques described herein may be used in other contexts both within and outside of sports. In addition to the tracking data (e.g., tracking data 104), other metadata such as game state data 110, player/team metadata 310, etc., may be received.

Processing may continue at action 520, at which a determination may be made, for at least the first frame of tracking data, a first predicted direction of motion based at least in part on a first objective. For example, supervised classifier 120 may predict the predicted optimal momentary direction 124 for at least the first frame of tracking data. In another example, the simulation component 122 may predict the predicted optimal path 126 for at least the first frame of tracking data. Accordingly, the first predicted direction of motion may be a prediction of an optimal momentary motion or may be a predicted optimal path (e.g., of a player, a thrown pass, etc.). The first objective may be sport dependent. For example, in American football the first objective may be to maximize the number of yards gained on the current play. In a basketball example, the first objective may be to score a basket on the current possession. In a hockey example, the first objective may be to maintain the puck in the offensive zone during a powerplay. It should be noted that these examples are non-exhaustive and are merely mentioned to display examples of what objectives may be. Different objectives apart from those specifically described herein may be used in accordance with the desired implementation.

Processing may continue at action 530 at which a second frame of tracking data indicating a second respective location of each player of the first plurality of players on the field plane at a second time may be received. For example, the second frame of tracking data may be received during the same play as the first frame of tracking data, but may represent the tracking data generated by the worn/embedded sensors at a later point in time relative to the first frame of tracking data.

Processing may continue at action 540 at which a determination may be made, for at least the second frame of tracking data, a second predicted direction of motion based at least in part on the first objective. For example, supervised classifier 120 may predict the predicted optimal momentary direction 124 for at least the second frame of tracking data. The new prediction may represent an updated version of the prediction made at action 520 based on the changing tracking data represented by the second frame of tracking data. In another example, the simulation component 122 may predict the predicted optimal path 126 for at least the second frame of tracking data. Accordingly, the second predicted direction of motion may be an updated prediction of an optimal momentary motion or may be an updated predicted optimal path (e.g., of a player, a thrown pass, etc.) based on at least the second frame of tracking data.

As the play continues, additional frames of tracking data may be sampled and used to either predict momentary direction of motion, perform updated simulations to generate updated predicted optimal paths, or both. Accordingly, in FIG. 5, an arrow shows that processing may return to action 510 at which additional frames of tracking data may be received.

Processing may continue at action 550, at which a first graphical overlay may be caused to be displayed on a live video feed of the sporting event. The first graphical overlay may be based on one or more of the first predicted direction and the second predicted direction. For example, smoothing may be used, as described herein, to generate the first graphical overlay to the extent that the predicted directions differ. Various display options are possible for the real-time graphical overlay and the present disclosure is not limited to any one type of graphical display. As previously described, in some examples the first graphical overlay may indicate a momentary direction of optimal motion for a player and/or ball. In some other examples, the first graphical overlay may indicate a path that a player and/or a ball in order to maximize the first objective (e.g., an arced trajectory of a thrown pass and/or a path that a ball carrier should take to pass the defensive line).

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A computer-implemented method comprising:
   receiving a first frame of tracking data indicating a first respective location of each player of a first plurality of players on a field plane at a first time, wherein the first frame of tracking data comprises data generated by a first plurality of sensors;
   executing a first simulation using a physics-based simulator and the first frame of tracking data, wherein the first simulation uses a set of sport-specific constraints to solve an optimization problem;
   generating, by the first simulation using the first frame of tracking data, first path data indicating a path for a first player of the first plurality of players, wherein the first path is determined by the first simulation by maximizing an objective associated with the first simulation;
   receiving a second frame of tracking data indicating a second respective location of each player of the first plurality of players on the field plane at a second time after the first time, wherein the second frame of tracking data is generated by the first plurality of sensors;
   executing a second simulation using the physics-based simulator and the second frame of tracking data, wherein the second simulation uses the set of sport-specific constraints to solve the optimization problem;
   generating, by the second simulation using the second frame of tracking data, second path data indicating a modified path for the first player of the first plurality of players relative to the first path data, wherein the second path is determined by the second simulation by maximizing the objective associated with the second simulation; and causing a first graphical overlay representing the second path data to be displayed on a live video feed depicting at least the first player.

2. The computer-implemented method of claim 1, further comprising:

determining, using a third frame of tracking data and a transformer-based classifier, a first predicted momentary direction of motion in the field plane, wherein the first predicted momentary direction of motion is determined by the transformer-based classifier to maximize a number of yards gained; and causing a second graphical overlay representing the first predicted momentary direction of motion to be displayed on the live video feed.

3. The computer-implemented method of claim 2, further comprising:

determining, using a fourth frame of tracking data and the transformer-based classifier, a second predicted momentary direction of motion in the field plane, wherein the second predicted momentary direction of motion is different from the first momentary direction of motion; and determining, over a first set of frames of tracking data, that a majority of frames of the first set of frames of tracking data are associated with the first predicted momentary direction of motion, wherein the first set of frames comprises the third frame and the fourth frame, wherein the second graphical overlay is caused to be displayed on the live video feed in response to the majority of frames being associated with the first predicted momentary direction.

4. A method comprising:

receiving a first frame of tracking data indicating a first respective location of each player of a first plurality of players on a field plane at a first time, wherein the first frame of tracking data comprises data generated by a first plurality of sensors;

determining, for at least the first frame of tracking data, a first predicted direction of motion based at least in part on a first objective;

receiving a second frame of tracking data indicating a second respective location of each player of the first plurality of players on the field plane at a second time, wherein the second frame of tracking data is generated by the first plurality of sensors;

determining, for at least the second frame of tracking data, a second predicted direction of motion based at least in part on the first objective; and causing a first graphical overlay to be displayed on a live video feed, wherein the first graphical overlay is based on one or more of the first predicted direction and the second predicted direction.

5. The method of claim 4, further comprising:

generating, using the first frame of tracking data and an encoder, first embedding data; and determining, by a supervised classifier model, the first predicted direction of movement.

6. The method of claim 5, wherein the supervised classifier model is trained to select a direction among a predefined set of angular directions that maximizes an objective associated with a first sport.

7. The method of claim 5, wherein the first embedding data comprises respective indicator data for each player of the first plurality of players, the respective indicator data indicating that the respective player is on an offensive team or a defensive team.

8. The method of claim 4, further comprising:

determining, over a first set of frames of tracking data comprising the first frame and the second frame, that a majority of frames of the first set of frames of tracking data are associated with the first predicted direction of motion, where the first graphical overlay indicates the first predicted direction of motion.

9. The method of claim 4, further comprising:

executing a first simulation using a physics-based simulator and the first frame of tracking data, wherein the first simulation uses a set of sport-specific constraints to solve an optimization problem, wherein the determining the first predicted direction of motion comprises determining a first path of motion in the field plane; and executing a second simulation using the physics-based simulator and the second frame of tracking data, wherein the second simulation uses the set of sport-specific constraints to solve the optimization problem, wherein the determining the second predicted direction of motion comprises determining a second path of motion in the field plane.

10. The method of claim 9, wherein the first frame of tracking data and the second frame of tracking data are sampled from first tracking data representing a single play.

11. The method of claim 9, wherein the first set of sport-specific constraints comprise:

first constraint data indicating that a player with a ball avoids defensive players;

second constraint data indicating that the defensive players attempt to intersect with the player with the ball in the field plane;

third constraint data indicating that the defensive players attempt to avoid offensive players other than the player with the ball; and fourth constraint data indicating that offensive players other than the player with the ball attempt to intersect with defensive players in the field plane.

12. The method of claim 4, wherein the first objective is to maximize a number of yards gained.

13. A system comprising:

at least one processor; and non-transitory computer-readable memory storing instructions that, when executed by the at least one processor, are effective to perform operations comprising:

receiving a first frame of tracking data indicating a first respective location of each player of a first plurality of players on a field plane at a first time, wherein the first frame of tracking data comprises data generated by a first plurality of sensors;

determining, for at least the first frame of tracking data, a first predicted direction of motion based at least in part on a first objective;

receiving a second frame of tracking data indicating a second respective location of each player of the first plurality of players on the field plane at a second time, wherein the second frame of tracking data is generated by the first plurality of sensors;

determining, for at least the second frame of tracking data, a second predicted direction of motion based at least in part on the first objective; and causing a first graphical overlay to be displayed on a live video feed, wherein the first graphical overlay is based on one or more of the first predicted direction and the second predicted direction.

14. The system of claim 13, wherein the non-transitory computer-readable memory stores further instructions that, when executed by the at least one processor, are effective to perform further operations comprising:
generating, using the first frame of tracking data and an encoder, first embedding data; and
determining, by a supervised classifier model or a regression model, the first predicted direction of movement.

15. The system of claim 14, wherein the supervised classifier model or the regression model is trained to select a direction among a predefined set of angular directions that maximizes an objective associated with a first sport.

16. The system of claim 14, wherein the first embedding data comprises respective indicator data for each player of the first plurality of players, the respective indicator data indicating that the respective player is on an offensive team or a defensive team.

17. The system of claim 13, wherein the non-transitory computer-readable memory stores further instructions that, when executed by the at least one processor, are effective to perform further operations comprising:
determining, over a first set of frames of tracking data comprising the first frame and the second frame, that a majority of frames of the first set of frames of tracking data are associated with the first predicted direction of motion, where the first graphical overlay indicates the first predicted direction of motion.

18. The system of claim 13, wherein the non-transitory computer-readable memory stores further instructions that, when executed by the at least one processor, are effective to perform further operations comprising:
executing a first simulation using a physics-based simulator and the first frame of tracking data, wherein the first simulation uses a set of sport-specific constraints to solve an optimization problem, wherein the determining the first predicted direction of motion comprises determining a first path of motion in the field plane; and
executing a second simulation using the physics-based simulator and the second frame of tracking data, wherein the second simulation uses the set of sport-specific constraints to solve the optimization problem, wherein the determining the second predicted direction of motion comprises determining a second path of motion in the field plane.

19. The system of claim 18, wherein the first frame of tracking data and the second frame of tracking data are sampled from first tracking data representing a single play.

20. The system of claim 13, wherein the first objective is to maximize a number of yards gained.

* * * * *